(12) United States Patent
Huang et al.

(10) Patent No.: US 11,294,845 B2
(45) Date of Patent: Apr. 5, 2022

(54) INFORMATION HANDLING SYSTEM MEMORY MODULE EXPANDER

(71) Applicant: Dell Products L.P., Round Rock, TX (US)

(72) Inventors: Yao-Fu Huang, New Taipei (TW); Chun Min He, Taipei (TW); Yi-Ning Shen, Yunlin Coutry (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/853,926

(22) Filed: Apr. 21, 2020

(65) Prior Publication Data
US 2021/0326291 A1 Oct. 21, 2021

(51) Int. Cl.
*G06F 13/40* (2006.01)

(52) U.S. Cl.
CPC ...... *G06F 13/4045* (2013.01); *G06F 13/4086* (2013.01)

(58) Field of Classification Search
CPC ............ G06F 13/4045; G06F 13/4086; G06F 13/382; G06F 13/385; G06F 13/387; G06F 1/185; G06F 3/0629
See application file for complete search history.

(56) References Cited

U.S. PATENT DOCUMENTS

| | | | |
|---|---|---|---|
| 7,411,843 B2 | 8/2008 | Ruckerbauer et al. | |
| 7,987,308 B2 | 7/2011 | Jo et al. | |
| 8,337,252 B2 | 12/2012 | Mambakkam et al. | |
| 2004/0264151 A1* | 12/2004 | Jakobs | G11C 11/4082 361/764 |
| 2008/0017718 A1 | 1/2008 | Jones et al. | |
| 2019/0334266 A1* | 10/2019 | Doehring-Patel | H01R 25/006 |
| 2019/0379157 A1* | 12/2019 | Chu | H01R 12/716 |
| 2020/0034327 A1* | 1/2020 | Kim | G06F 13/1668 |
| 2021/0148459 A1* | 5/2021 | Imasato | F16H 61/0021 |
| 2021/0157763 A1* | 5/2021 | Jabori | G06F 13/385 |

FOREIGN PATENT DOCUMENTS

DE 10305837 B4 3/2009

* cited by examiner

*Primary Examiner* — Raymond N Phan
(74) *Attorney, Agent, or Firm* — Zagorin Cave LLP; Robert W. Holland (57) ABSTRACT

An information handling system couples a solid state drive assembly having plural solid state drives to a motherboard with a single M.2 connector coupled to the motherboard by interfacing the plural solid state drives with an adapter circuit board having an M.2 interface defined at one end to insert into the motherboard connector and having plural M.2 connectors to interface with the plural solid state drives in a desired configuration, such as a stacked vertical configuration that more efficiently uses motherboard footprint to include persistent memory.

13 Claims, 10 Drawing Sheets

| PIN # | FUNCTION | PIN # | FUNCTION | ADAPTER FUNCTION |
|---|---|---|---|---|
| 1 | GND | 2 | 3.3V | |
| 3 | GND | 4 | 3.3V | |
| 5 | PETn3 | 6 | NC | PETn3 |
| 7 | PETp3 | 8 | NC | PETp3 |
| 9 | GND | 10 | LED/DAS | |
| 11 | PERn3 | 12 | 3.3V | |
| 13 | PERp2 | 14 | 3.3V | |
| 15 | GND | 16 | 3.3V | |
| 17 | PETn2 | 18 | 3.3V | |
| 19 | PETp2 | 20 | NC | PERn3 |
| 21 | GND | 22 | NC | PERp3 |
| 23 | PERn2 | 24 | NC | PETn2 |
| 25 | PERp2 | 26 | NC | PETp2 |
| 27 | GND | 28 | NC | PERn2 |
| 29 | PERn1 | 30 | NC | PERp2 |
| 31 | PETp1 | 32 | NC | PERn1 |
| 33 | GND | 34 | NC | PERp1 |
| 35 | PERn1 | 36 | NC | PETn1 |
| 37 | PETp1 | 38 | NC | PETp1 |

TO FIG. 2B

FROM FIG. 2A

| PIN # | FUNCTION | PIN # | FUNCTION | ADAPTER FUNCTION |
|---|---|---|---|---|
| 39 | GND | 40 | NC | PERn0 |
| 41 | PERn0 | 42 | NC | PERp0 |
| 43 | PETp0 | 44 | NC | PETn0 |
| 45 | GND | 46 | NC | PETp0 |
| 47 | PERn0 | 48 | NC | |
| 49 | PETp0 | 50 | PERST# | |
| 51 | GND | 52 | CLKREQ# | |
| 53 | REFCLKn | 54 | NC | |
| 55 | REFCLKp | 56 | NC | REFCLKn |
| 57 | GND | 58 | NC | REFCLKp |
| 59 | M KEY | 60 | M KEY | |
| 61 | M KEY | 62 | M KEY | |
| 63 | M KEY | 64 | M KEY | |
| 65 | M KEY | 66 | M KEY | |
| 67 | NC | 68 | NC | |
| 69 | NC | 70 | 3.3V | |
| 71 | GND | 72 | 3.3V | |
| 73 | GND | 74 | 3.3V | |
| 75 | GND | | | |

INFORMATION HANDLING SYSTEM MEMORY MODULE EXPANDER

BACKGROUND OF THE INVENTION

Field of the Invention

The present invention relates in general to the field of portable information handling system memory, and more particularly to an information handling system memory module expander.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components, a display and a power source in a portable housing to support mobile operations. Portable information handling systems allow end users to carry a system between meetings, during travel, and between home and office locations so that an end user has access to processing capabilities while mobile. Tablet portable information handling system configurations typically expose a touchscreen display on a planar housing that both outputs information as visual images and accepts inputs as touches. Convertible information handling system portable configurations typically include multiple separate housing portions that couple to each other so that the system converts between closed and open positions. For example, a main housing portion integrates processing components and a keyboard and rotationally couples with hinges to a lid housing portion that integrates a display. In a clamshell configuration, the lid housing portion rotates approximately ninety degrees to a raised position above the main housing portion so that an end user can type inputs while viewing the display. After usage, convertible information handling systems rotate the lid housing portion over the main housing portion to protect the keyboard and display, thus reducing the system footprint for improved storage and mobility.

Generally, manufacturers attempt to build portable information handling systems in housings that have a minimal height. Such low profile systems improve portability by reducing the room needed to store the system when not in use, such as in a briefcase or purse. In order to minimize system height, manufacturers design portable information handling systems to integrate components that have a minimal height as well as reduced power consumption and thermal energy generation. One example of this is the adoption of solid state drives (SSD) in the place of hard disk drives (HHD). Hard disk drives rotate a magnetic media to write and read information. The mechanical rotation of the magnetic media uses power and offers a point of failure as mechanical components wear over time. In contrast, solid state drives use flash memory that store information in an integrated circuit that persistently retains the information without application of power. Although solid state drives tend to reduce power consumption and improve system reliability, they also tend to increase cost for a given amount of storage and can have a considerable footprint when included on a portable information handling system motherboard.

Often solid state drives are interfaced to an information handling system motherboard by an M.2 standard adapter connector that couples to a system motherboard, such as by a surface mount. The M.2 standard supports a single solid state drive M.2 module with a defined module connector. Essentially, the solid state drive is built with one or more flash memory packages coupled to a printed circuit board (PCB) having pins exposed at a module interface that inserts into the module connector. The information handling system accesses information stored in the flash memory with requests applied through the module connector as defined by the M.2 standard pin assignments. A difficultly with this arrangement is that solid state drives on a single PCB do not scale well to portable information handling systems having different housing heights. In very thin information handling systems, a single PCB thickness may efficiently use available housing vertical space, however, in housings with additional height, the area above a solid state drive PCB tends to be inefficiently used.

SUMMARY OF THE INVENTION

Therefore, a need has arisen for a system and method which vertically stacks solid state drives within an information handling system housing at a single connector.

In accordance with the present invention, a system and method are provided which substantially reduce the disadvantages and problems associated with previous methods and systems for integrating solid state drives in a portable information handling system housing. A solid state drive assembly couples plural solid state drives to an adapter having a single interface to couple to a single motherboard solid state drive module connector so that the plural solid state drives interface with the motherboard through the single motherboard module connector. The adapter arranges module connectors to achieve a desired footprint of the solid state drives within the information handling system relative to the motherboard module connectors, such as vertically stacking the solid state drives to increase storage available in a given motherboard footprint.

More specifically, an information handling system processes information with processing components disposed in a housing, such as a CPU and RAM coupled to a motherboard printed circuit board. Persistent storage is provided by a solid state assembly having plural sold state drives coupled to an adapter with a single interface to couple to a single module connector of the motherboard. The solid state drive adapter has an adapter printed circuit board with plural adapter module connectors coupled to the adapter printed circuit board. The plural adapter module connectors are disposed on the adapter printed circuit board to achieve a desired footprint of the solid state assembly relative to the motherboard module connector. One example embodiment disposes adapter module connectors vertically stacked on upper and lower surfaces of the adapter printed circuit board so that solid state drives couple to the adapter printed circuit board with a vertical stacking that reduces the relative footprint of the solid state drive assembly over the motherboard.

The present invention provides a number of important technical advantages. One example of an important technical advantage is that an information handling system circuit board footprint within a portable housing is more efficiently used by stacking plural solid state drives in a vertical manner. Each solid state drive layer interfaces with an adapter connector so that the assembly of plural solid state drives and the adapter connector couple to an information handling system motherboard as a single assembly to a single motherboard module connector. As a result, the information handling system includes an increased amount of persistent memory within a given motherboard footprint at a single solid state drive module connector.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system motherboard solid state drive module connector couples to a solid state drive assembly having plural solid state drives through a single connector interface of an adapter that supports communication between the solid state drives and motherboard. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
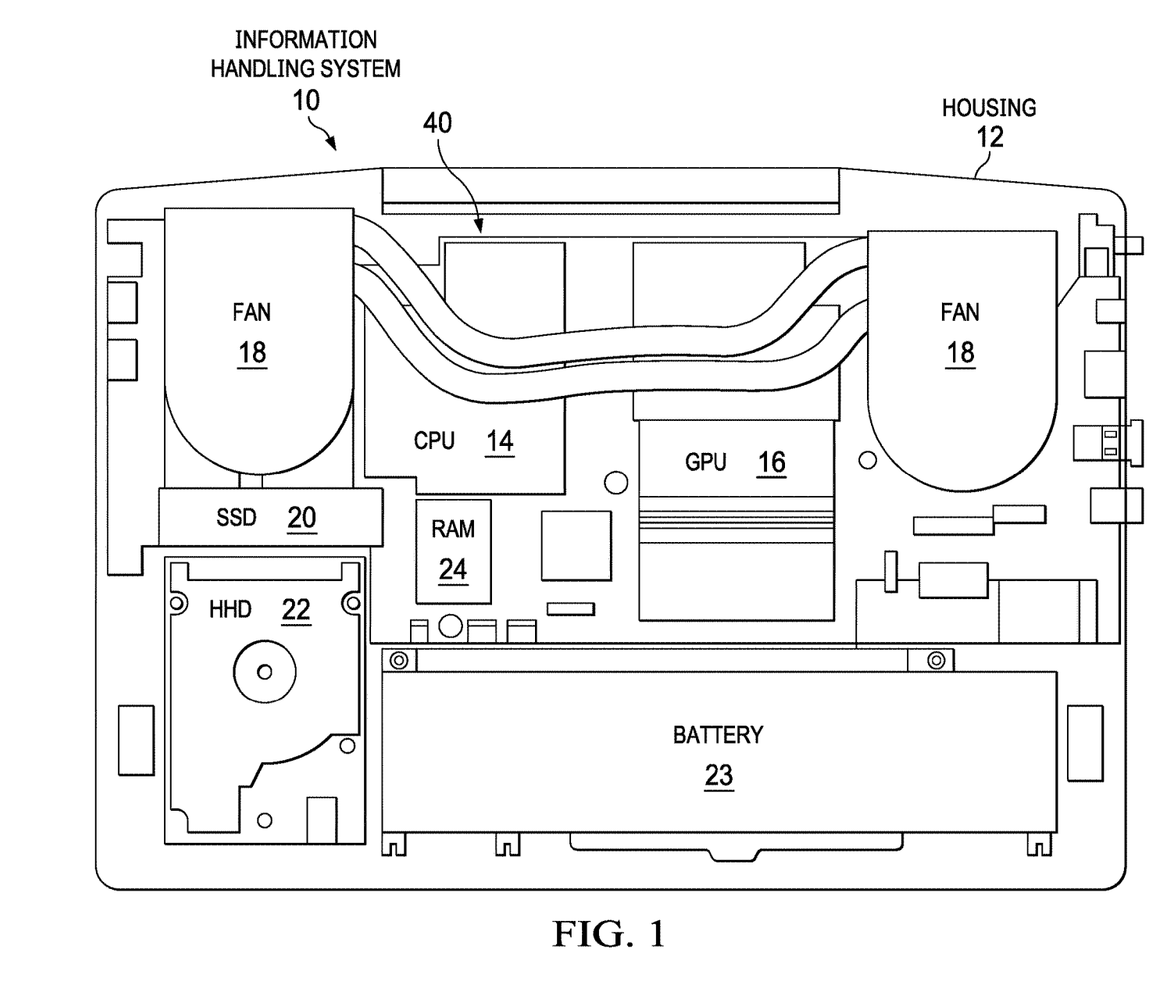
FIG. 1 depicts an upper cutaway view of an information handling system having a solid state drive assembly coupled to a motherboard through a single M.2 connector.

Referring now to FIG. 1, an upper cutaway view depicts an information handling system 10 having a solid state drive assembly 42 coupled to a motherboard 40 through a single M.2 solid state drive module connector 28. In the example embodiment, information handling system 10 is built in a portable housing 12, such as may support a tablet configuration with a display disposed over the top surface or a clamshell configuration with a display disposed in a rotationally-coupled lid housing portion. Motherboard 40 couples to housing 12 and supports communication between processing components with integrated wirelines and contact pads formed as a printed circuit board. In the example embodiment, a central processing unit (CPU) 14 couples to motherboard 40 to execute instructions that process information. CPU 14 interfaces with a random access memory (RAM) 24 through motherboard 40 to retrieve and store the information and instructions in an active memory. A graphics processor unit (GPU) 16 interfaces with CPU 14 to process visual information into pixel values that define a visual image at a display. A a pair of cooling fans 18 thermally interface through heat pipes with CPU 14 and GPU 16 to aid rejection of excess thermal energy from housing 12. Information for processing by CPU 14 is stored in persistent storage, such as flash memory, and retrieved through RAM 24 for access by CPU 14. In the example embodiment, persistent storage is provided by one or more solid state drives (SSD) 20 or a hard disk drive (HDD) 22. A battery 23 interfaces with motherboard 40 to provide power for operating the processing components. A typical information handling system includes one or more embedded controllers, power supplies, chargers and other components that manage power and thermal constraints. In various embodiments, different types of information handling system configurations may be used.

Figure 1A:
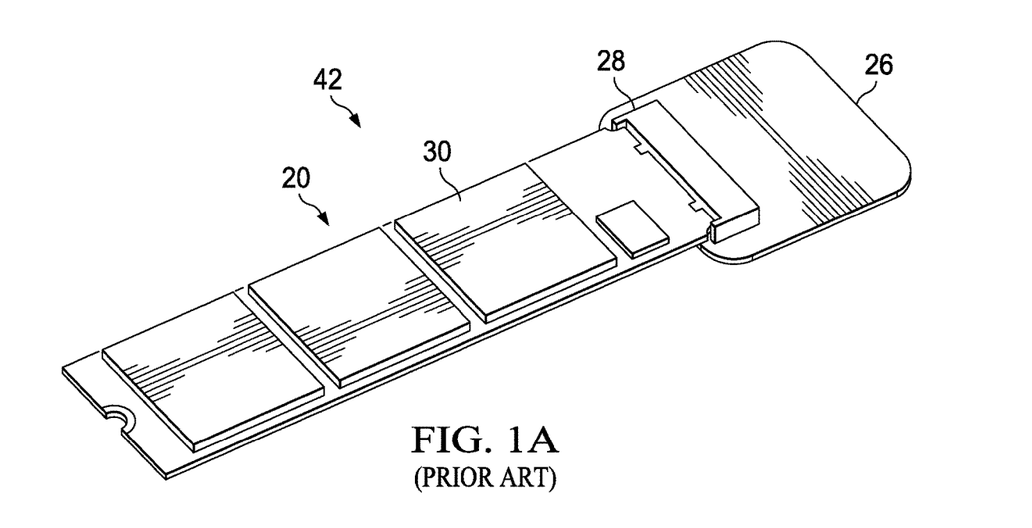
FIGS. 1A, 1B, 1C and 1D depict various solid state drive assembly configurations.
Figure 2A:
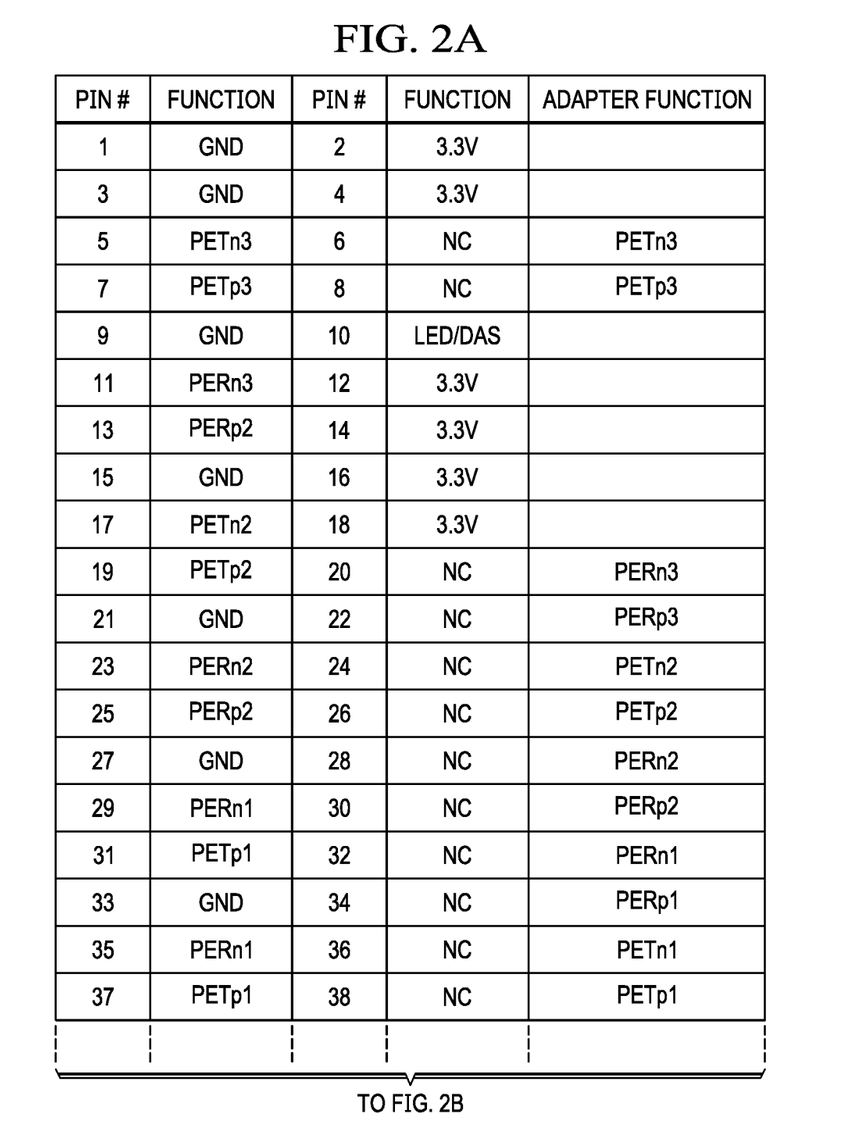
FIGS. 2A and 2B depict an example of pin assignments for a motherboard module connector that interfaces with an SSD assembly having plural SSDs.
Figure 2B:
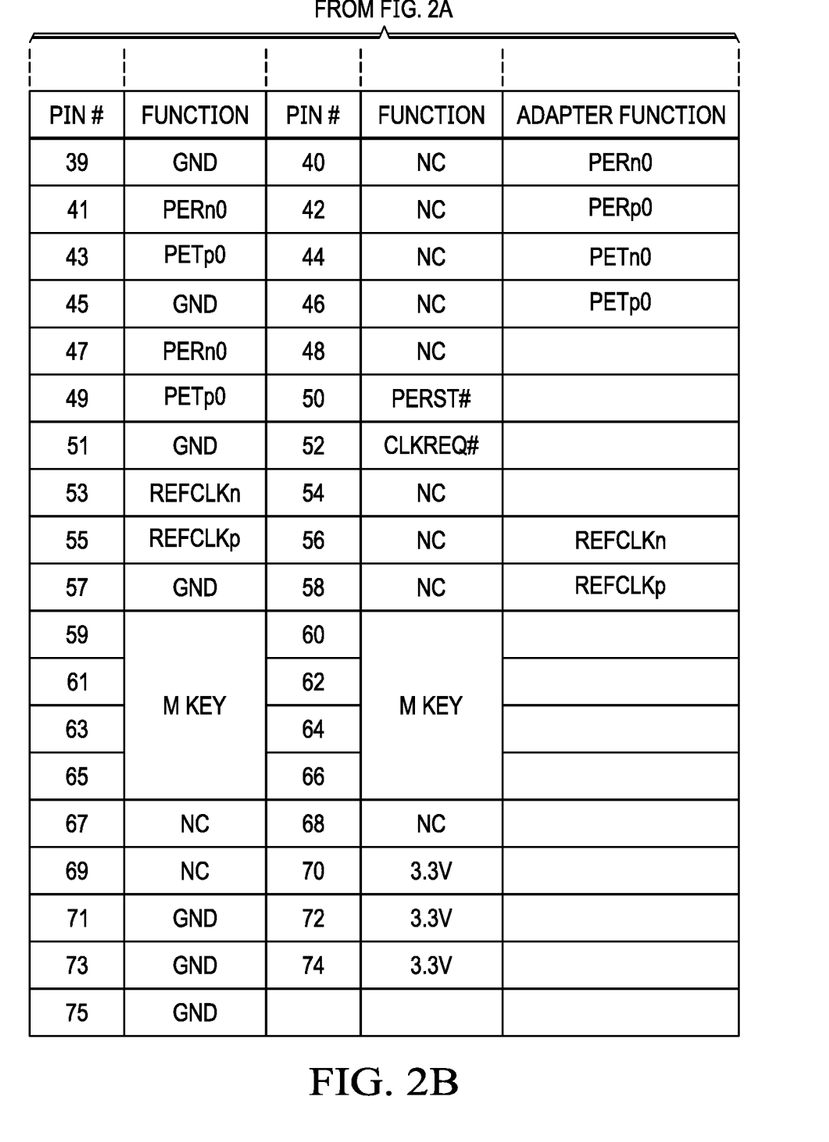

As depicted by FIG. 1, solid state drives (SSDs) 20 couple to motherboard 40 with a planar rectangular footprint that tends to consume a relatively large surface area of motherboard 40. In the example embodiment, SSD 20 couples to motherboard 40 with an M.2 standard connector coupled to motherboard 40, such as with an SMT or other technique. The M.2 standard module connector has a slot and pins to accept a single SSD module, however, SSD modules typically have a limited height so that space above the SSD module is open. For instance, FIG. 1A depicts an example embodiment of an SSD assembly 42 having an SSD 20 with plural flash memory packages 30 coupled to a module connector 28 that is communicatively coupled to a coupling plate 26, such as a printed circuit board. FIG. 2 depicts pin assignments of the M.2 connector to provide power, ground, logical commands and information transfer between flash memory packages 30 and the processor or other components of motherboard 40, such as with commands provided through a memory controller on SSD 20.

Figure 1B:
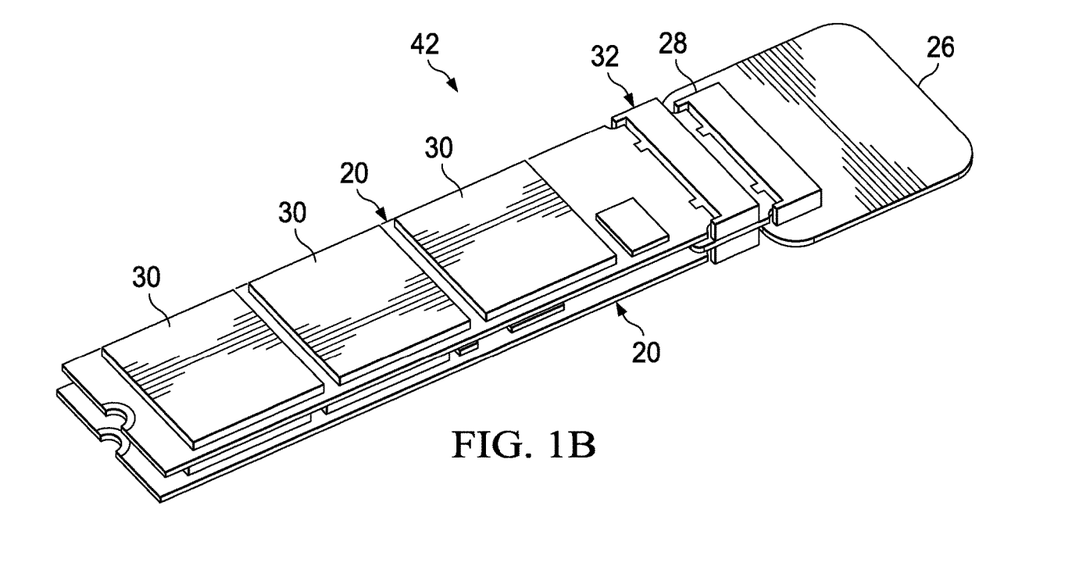

In order to reduce the footprint for each unit of persistent memory storage, SSD assemblies 42 are provided that vertically stack plural SSDs 20 while coupling to motherboard 40 at a single motherboard module connector 28. FIG. 1B depicts one example of an SSD assembly having plural SSDs assembled to communicate through a single motherboard module connector 28. In the example embodiment, first and second SSDs 20 stack in a vertical alignment with each coupling to an adapter connector 32, which in turn couples to motherboard module connector 28. FIG. 2 illustrates an example of pin interfaces to support an adapter function by leveraging open pins of a single SSD interface. The pin assignments are applied at SMT of module connector 28 to motherboard 40 and when interfacing logical requests to the SSD assembly 42 by information handling system processing components. The example embodiment of FIG. 1B provides greater storage for a given motherboard footprint by including dual equal-sized SSDs 20 with one SSD stack over top of the other at a location that would otherwise only have room for a single SSD 20. Each SSD 20 has three flash memory packages 30 that also stack in vertical alignment.

Figure 1C:
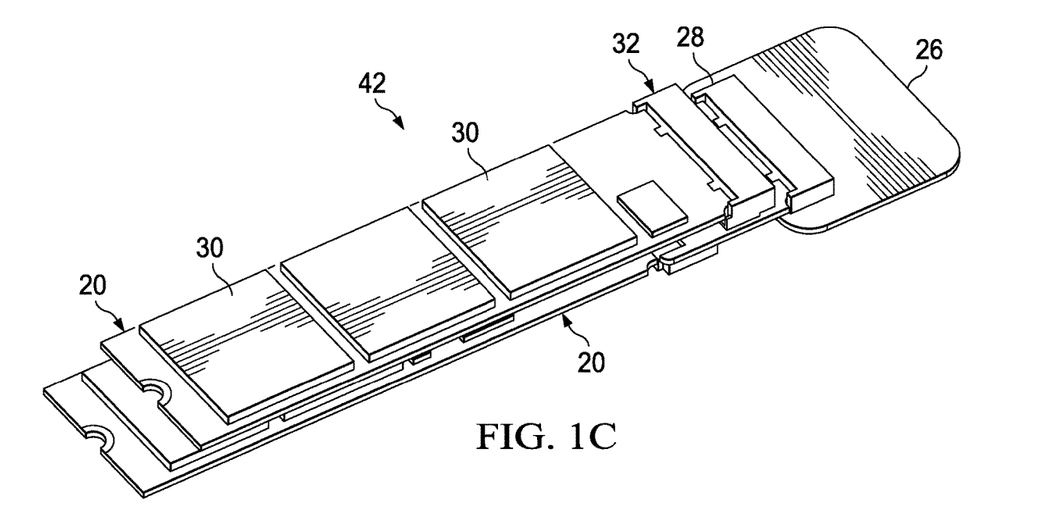
Figure 1D:
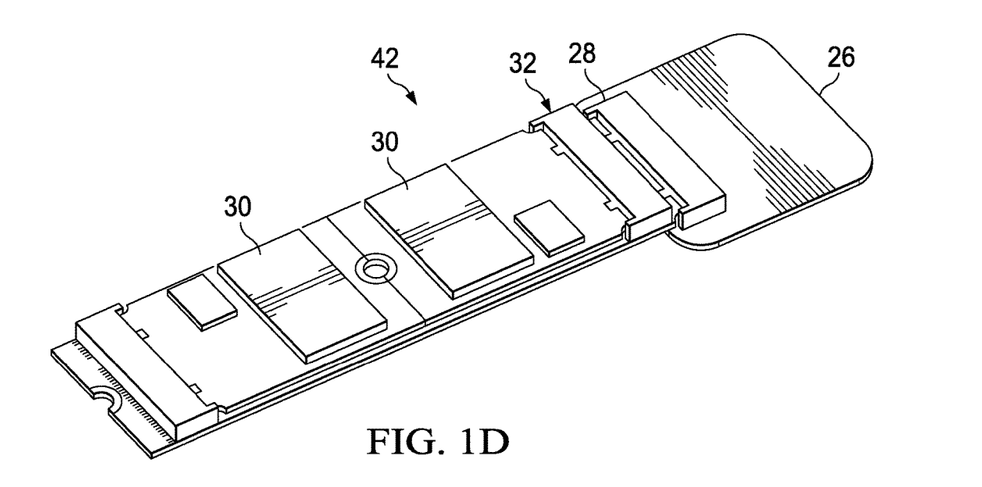

FIG. 1C illustrates an example of SSD assemblies 42 having flash memory modules 30 offset in each of the SSDs 20. The example embodiment of FIG. 1C adapter connector 32 has first and second laterally offset adapter module connectors so that vertically stacked SSDs have a slight lateral offset rather than a direct vertical alignment. Lateral offset of SSDs 20 may be selected to adapt to a desired footprint or thermal characteristic within housing 12. In addition, the arrangement of FIG. 1C can support three vertically stacked SSDs 20 as describe in greater detail below at FIG. 4. FIG. 1D depicts an SSD assembly 42 having first and second SSDs 20 coplanar resting on adapter circuit board 38 and an adapter connector 32 that couples each SSD 20 at an opposing end, as illustrated in greater detail by FIG. 5. In an alternative embodiment, SSDs 20 may also be stacked on at one side of adapter circuit board 38 with adapter module connectors 36 having different heights. To reduce stacked height, solid state drives 20 may have spaced flash memory packages 30 interleaved between the vertically stacked SSDs 20 to offset height of the flash memory packages 30. For instance, in one embodiment SSDs 20 align in an opposed vertical orientation to have flash memory packages 30 facing each other and offset by the interleaved spacing between the opposing flash memory packages 30 to provide a low height solution.

Figure 3:
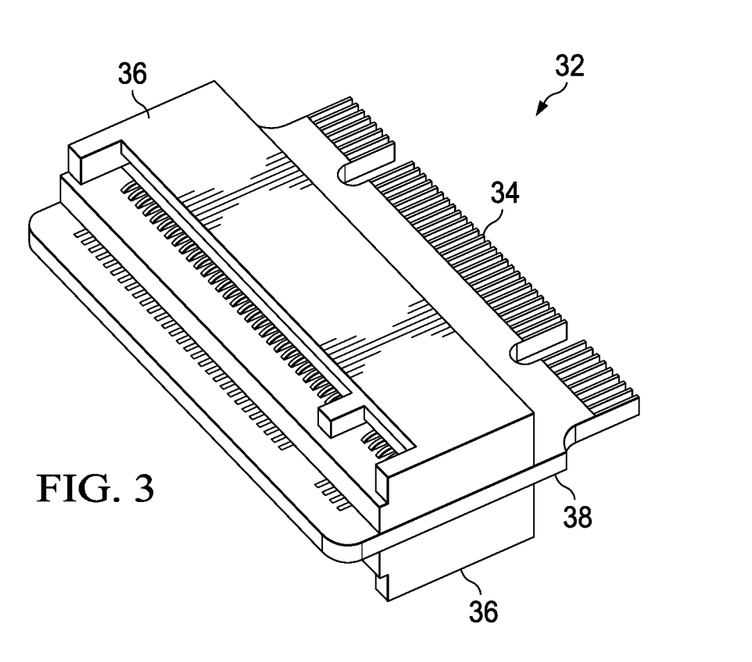
FIG. 3 depicts an upper side perspective view of an example embodiment of a dual SSD adapter connector.

Referring now to FIG. 3, an upper side perspective view depicts an example embodiment of a dual SSD adapter connector 32. An adapter printed circuit board 38 has a first adapter module connector 36 coupled to an upper surface and a second adapter module connector 36 coupled to a lower surface. In the example embodiment, each adapter module connector 36 is an M.2 connector configured to couple to a single SSD inserted from one side. At an opposing side, a module connector interface is integrated with plural pins configured to couple to a motherboard module connector. Adapter module connectors 36 align vertically over each other so that SSDs that couple to the adapter module connectors will align vertically directly over each other. As depicted by FIG. 1B. Wirelines in adapter printed circuit board 38 communicate between adapter module connectors 36 and pins of interface 34 as defined by FIG. 2.

Figure 4:
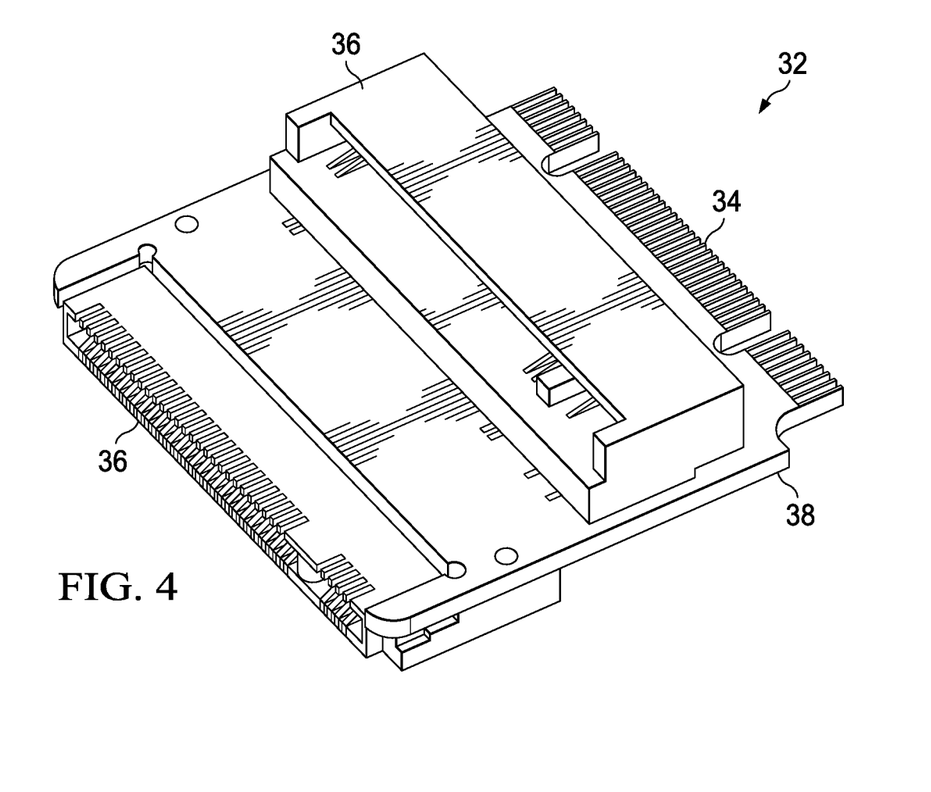
FIG. 4 depicts an upper side perspective view of an alternative example embodiment of a dual SSD adapter connector.

Referring now to FIG. 4, an upper side perspective view depicts an example embodiment of a dual SSD adapter connector having vertically offset solid state drive alignment, such as depicted by FIG. 1C. A first adapter connector 36 at an upper surface of adapter circuit board 38 is coupled in closer proximity to the adapter interface 34 than a second adapter connector 36 at a lower surface of adapter circuit board 38. The lower surface adapter connector 36 couples abutted against the side of adapter printed circuit board 38 to provide a low profile solid state drive coupling location relative to the surface of the motherboard module connector. By reducing the height of the solid state drive coupled at the lower module connector relative to the lower surface, the solid state drive assembly more efficiently uses vertical space. In one alternative embodiment, a third module connector may be included by having the adapter module connector 36 at the side surface raised to a mid-point of the side surface and coupling the third adapter module connector to the lower surface under the first adapter module connector. In such an example embodiment, if insufficient M.2 pins are available to communicate simultaneously with all three solid state drives, additional logic may be included in the adapter printed circuit board to allow sharing of the adapter circuit board interface pins, such as a mux/demux with a selection control wire interfaced with the motherboard to allow motherboard processing components to command which two of the three solid state drives interface through the motherboard module connector at any one time.

Figure 5:
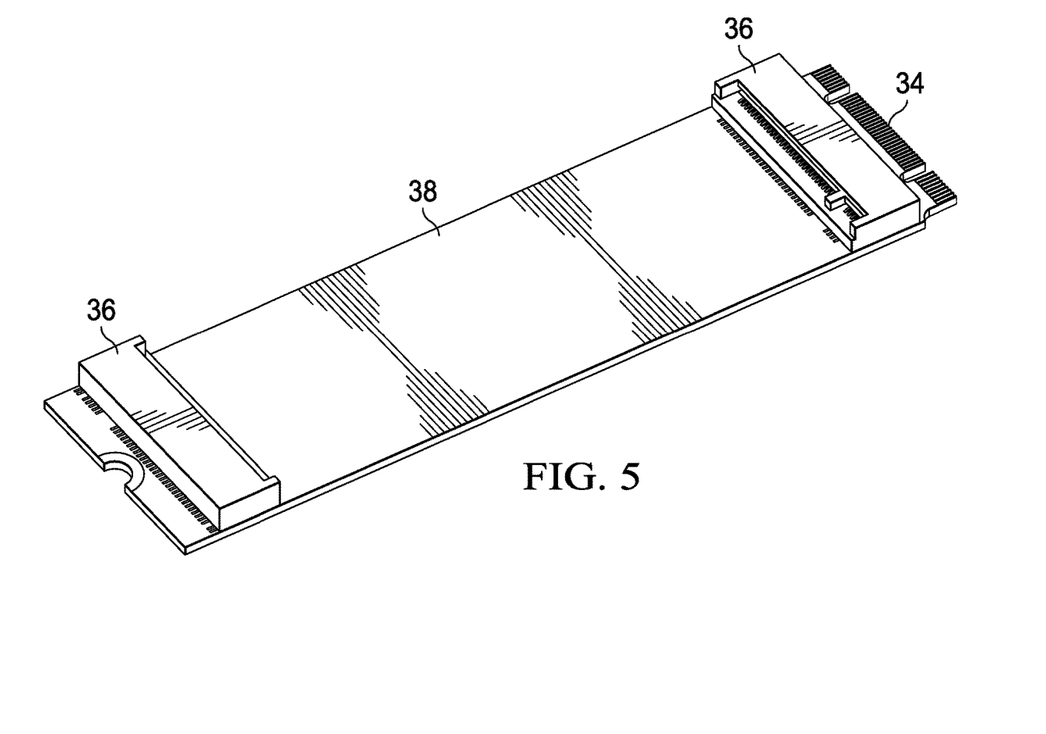
FIG. 5 depicts an upper side perspective view of an alternative example embodiment of a dual SSD adapter connector.

Referring now to FIG. 5, an upper side perspective view depicts an alternative example embodiment of a dual SSD adapter module connectors 36 coupled at opposing ends of the adapter printed circuit board 38, such as to support the solid state drive assembly depicted by FIG. 1D. Adapter circuit board 38 extends below the solid state drives along their length to rest against the motherboard as a supporting surface. Each solid state drive slides into its respective adapter module connector 36 along the same axis but in opposite directions. In one example embodiment, each solid state drive has one-half the length of adapter circuit board 38 so that both solid state drives share a common plane resting on adapter circuit board 38. In an alternative embodiment, different heights may be defined for each solid state drive so that the solid state drives vertically stack over each other along the entire length of adapter circuit board 38.

Figure 6A:
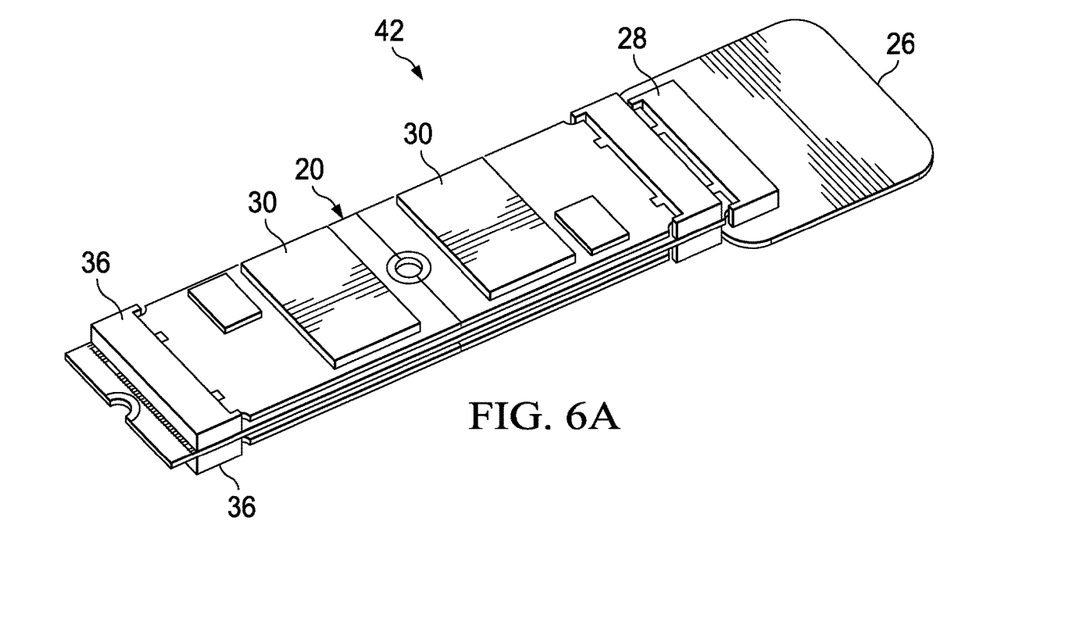
FIGS. 6A and 6B depict an upper perspective view of an alternative example embodiment of a quad SSD assembly and adapter.
Figure 6B:
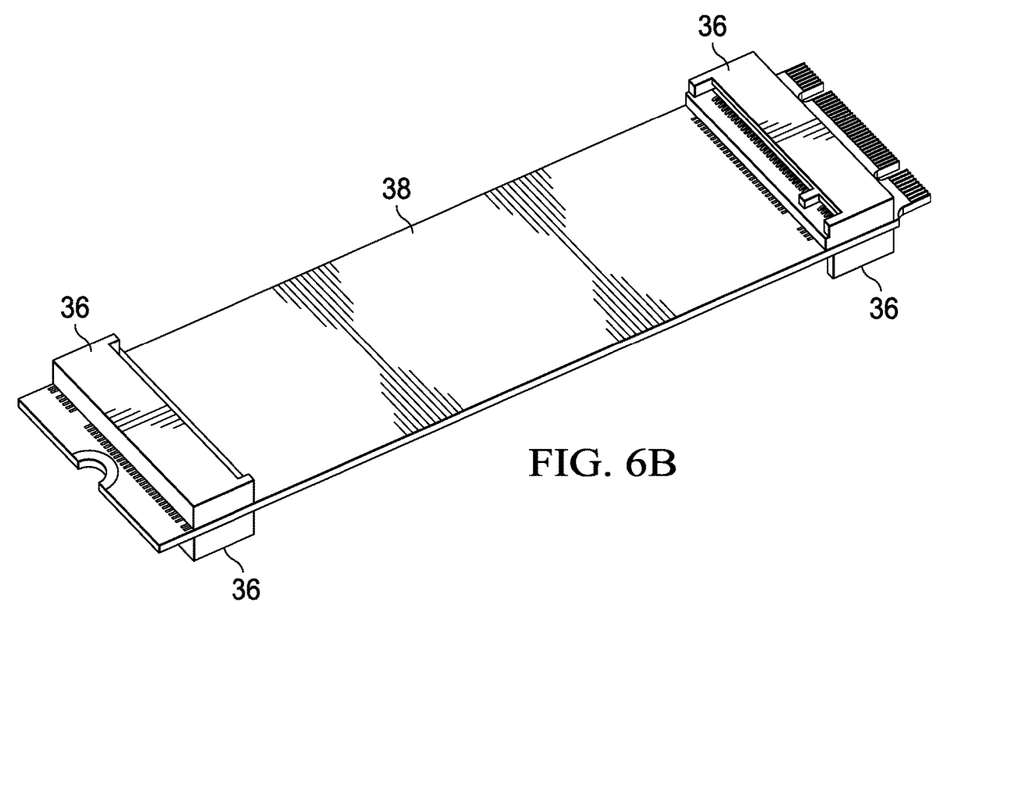

Referring now to FIGS. 6A and 6B, an upper perspective view depicts an alternative example embodiment of a quad SSD assembly 42 and adapter 32 with an opposing end configuration similar to FIG. 5. In the example embodiment, adapter module connectors 36 couple at opposing ends on both the upper and lower surfaces of adapter printed circuit board 38 to interface four solid state drives 20 with two coupled to the top surface of adapter circuit board 38 and two coupled to the bottom surface. As described above, four vertically stacked solid state drives 20 may be coupled to adapter printed circuit board 38 by integrating adapter connector modules 36 of different height on the upper and lower surface. In such an embodiment, two solid state drives 20 couple in opposing directions at the upper surface and two solid state drives 20 couple in opposing directions at the lower surface. In one embodiment where dual full length solid state drives couple to a surface of adapter printed circuit board 38, flash memory packages may have interleaved spacing to reduce solid state drive assembly 42 height.

Figure 7A:
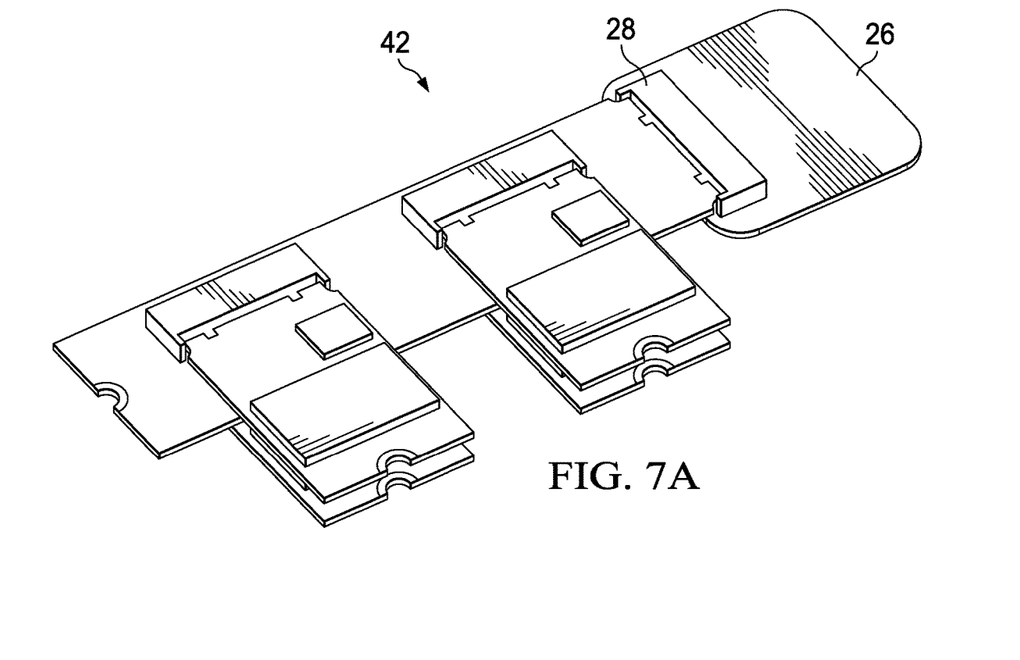
FIGS. 7A and 7B depict an upper perspective view of an alternative example embodiment of a quad SSD assembly and adapter with a perpendicular configuration.
Figure 7B:
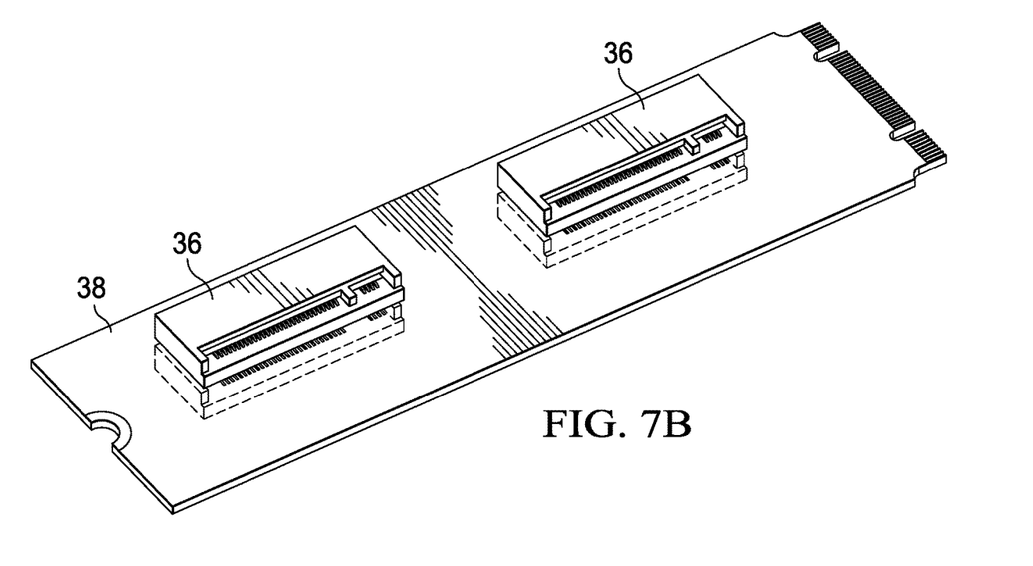

Referring now to FIGS. 7A and 7B, an upper perspective view depicts an alternative example embodiment of a quad SSD assembly and adapter with a perpendicular configuration. In the example embodiment, adapter circuit board 38 includes interface 34 at one side to insert into a motherboard and four adapter module connectors 36 oriented perpendicular to interface 34, with two adapter module connectors 36 on a top surface and two on a lower surface. In the example embodiment, four solid state drives 20 coupled to adapter printed circuit board 38 extend perpendicular to the length of adapter circuit board 38 and over the system motherboard. As described above if the motherboard module connector has insufficient pins to simultaneously interface with all four solid state drives, a mux/demux or other logic may be incorporated in adapter circuit board 38 to allow processing components of the motherboard to select which of the solid state drives interface through the module connector pins.

Figure 8:
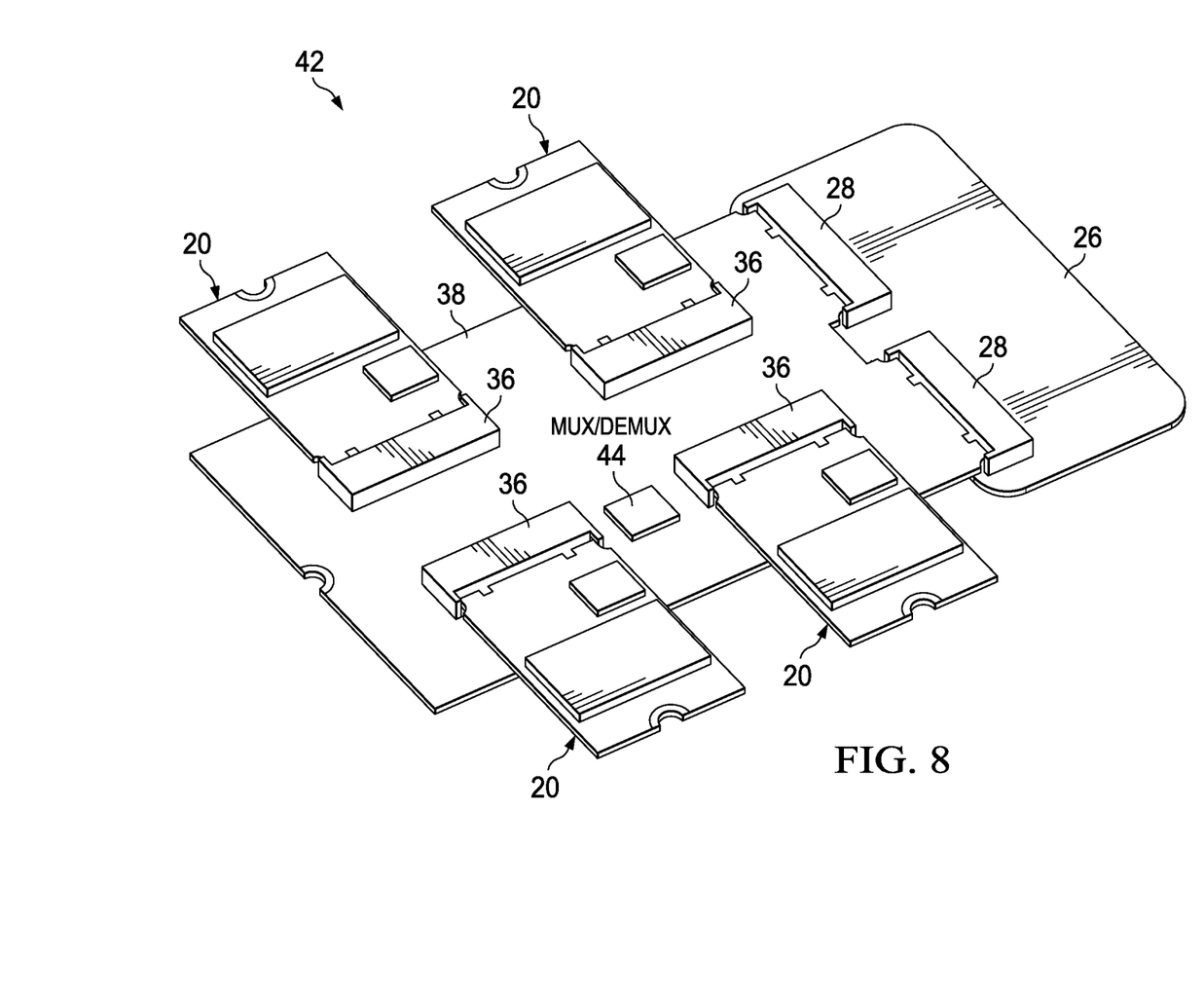
FIG. 8 depicts an upper perspective view of an alternative example embodiment having an adapter board with multiple interfaces that connect to multiple motherboard connectors.

Referring now to FIG. 8, an upper perspective view depicts an alternative example embodiment having an adapter board 38 with multiple interfaces 34 that connect to multiple motherboard connectors 28. A mux/demux 44 or other switching device integrates in the adapter board so that processing components of the information handling system control which SSD outputs at which of the plural interfaces 34. By selectively interfacing each SSD through mux/demux 44 with each interface 34, information handling system 10 has greater flexibility to access information as needed without a dedicated communication path.

FIG. 8 illustrates an example of interfacing one board through multiple interfaces to multiple motherboard connectors. Another alternative is to daisy chain an adapter connector to support an interface with a separate adapter board. That is, rather than coupling an SSD to each adapter connector, an SSD assembly couples to an adapter connector so that multiple SSD assemblies combine to define a complete SSD assembly coupled to a single motherboard connector. In such an embodiment, the adapter connector has one set of wirelines for multiple SSDs of one adapter assembly shared between multiple SSDs by a mux/demux and another set of wirelines for multiple SSDs of another adapter assembly shared between its multiple SSDs by a mux/demux. In various embodiments, different configurations may be built as desired to provide adequate storage for an information handling system.

Although the present invention has been described in detail, it should be understood that various changes, substitutions and alterations can be made hereto without departing from the spirit and scope of the invention as defined by the appended claims.

What is claimed is:

1. An information handling system comprising:
a housing;
a motherboard disposed in the housing;
a central processing unit coupled to the motherboard and operable to process information;
a solid state drive assembly module connecter coupled to the motherboard and interfaced with the central processing unit, the solid state drive assembly module connector having an opening with pins to accept a single solid state drive interface; and
a solid state drive assembly having plural solid state drives coupled to an adapter connector, each solid state drive having a printed circuit board terminating with an interface having plural pins, the adapter connector having a printed circuit board terminating with an interface having plural pins and plural solid state drive module connectors coupled to the printed circuit board;
wherein the plural solid state drive printed circuit board interfaces insert into the adapter connector plural solid state drive module connectors and the solid state drive assembly printed circuit board interface inserts into the solid state drive module connector to support communication between the plural solid state drives and the central processor unit; and
wherein:
the solid state drive assembly plural solid state drive module connectors align offset vertically; and
each solid state drive assembly printed circuit board having plural spaced flash memory packages vertically aligned offset from each other.

2. The information handling system of claim 1 wherein the solid state drive assembly adapter connector solid state drive module connectors align perpendicular to the solid state drive assembly module connector.

3. The information handling system of claim 2 wherein the solid state drives extend outward from the adapter connector perpendicular to the solid state drive assembly module connector.

4. The information handling system of claim 2 wherein the solid state drive assembly adapter connector solid state drive module connectors are disposed on both an upper surface and a lower surface of the adapter connector printed circuit board.

5. An information handling system comprising:
a housing;
a motherboard disposed in the housing;
a central processing unit coupled to the motherboard and operable to process information;
a solid state drive assembly module connecter coupled to the motherboard and interfaced with the central processing unit, the solid state drive assembly module connector having an opening with pins to accept a single solid state drive interface; and
a solid state drive assembly having plural solid state drives coupled to an adapter connector, each solid state drive having a printed circuit board terminating with an interface having plural pins, the adapter connector having a printed circuit board terminating with an interface having plural pins and plural solid state drive module connectors coupled to the printed circuit board;
a first solid state drive module connector at an upper side of the adapter connector printed circuit board;
a second solid state drive module connector at a lower side of the adapter connector printed circuit board;
a first solid state drive coupled to the first solid state drive module connector;
a second solid state drive coupled to the second solid state drive module connector;
a third solid state drive coupled to the adapter connector circuit board opposing end;
wherein the plural solid state drive printed circuit board interfaces insert into the adapter connector plural solid state drive module connectors and the solid state drive assembly printed circuit board interface inserts into the solid state drive module connector to support communication between the plural solid state drives and the central processor unit;
wherein the adapter connector printed circuit board terminates at one end with the interface for the solid state drive assembly module connecter and at an opposing ends with pins aligned to interface with a solid state drive.

6. A method for interfacing a solid state drive assembly and an information handling system, the method comprising:
coupling first and second solid state drive module connectors to an adapter circuit board, the adapter circuit board terminating at one end with plural pins interfaced with the first and second solid state drive module connectors;
inserting a first solid state drive in the first solid state drive module connector;
inserting a second solid state drive in the second solid state drive module connector; and
inserting the adapter circuit board plural pins into a motherboard solid state drive module connector;
interfacing both the first and second solid state drives with a processor through the motherboard solid state drive module connector;
coupling the first solid state drive module connector to an upper side of the adapter circuit board;
coupling the second solid state drive module connector to a lower side of the adapter circuit board;
inserting the first and second solid state drive modules into the first and second solid state drive module connectors to stack with a vertical alignment;
forming a solid state drive module connector at a side of the adapter circuit board opposite the plural pins; and
inserting a third solid state drive module at the side of the adapter circuit stacked between the first and second solid state modules.

7. The method of claim 6 wherein:
each solid state drive module has plural flash memory packages; and
the solid state drive modules vertically stack with the flash memory packages interleaved.

8. A method for interfacing a solid state drive assembly and an information handling system, the method comprising:
coupling first and second solid state drive module connectors to an adapter circuit board, the adapter circuit board terminating at one end with plural pins interfaced with the first and second solid state drive module connectors;
inserting a first solid state drive in the first solid state drive module connector;
inserting a second solid state drive in the second solid state drive module connector; and
inserting the adapter circuit board plural pins into a motherboard solid state drive module connector;
interfacing both the first and second solid state drives with a processor through the motherboard solid state drive module connector;
the coupling first and second solid state drive module connectors further comprises coupling the first and second solid state drive module connectors in a perpendicular orientation relative to the adapter circuit board side having the plural pins;
coupling both the first and second solid state drive module connectors to an upper side of the adapter circuit board;
inserting the first and second solid state drive modules into the first and second solid state drive module connectors in a parallel side-by-side alignment;
the coupling the first and second solid state drive module connectors further comprises coupling the first and second solid state drive module connectors at opposing ends of an upper side of the adapter circuit board;
inserting the first solid state drive module into the first solid state drive module connector along a first axis in a first direction; and
inserting the second solid state drive module into the second solid state drive module connector along the first axis in a second direction opposite the first direction.

9. The method of claim 8 further comprising:
coupling third and fourth solid state drive module connectors at opposing ends of a lower side of the adapter circuit board
inserting a third solid state drive module into the third solid state drive module connector along a first axis in a first direction; and
inserting a fourth solid state drive module into the fourth solid state drive module connector along the first axis in a second direction opposite the first direction.

10. A solid state drive assembly comprising:
an adapter circuit board terminating at one side with a solid state drive interface configured to insert into a motherboard solid state drive module connector to communicate with a motherboard;
plural solid state drive module connectors coupled to the adapter circuit board and in communication with the solid state drive interface;
a mux/demux coupled to the adapter circuit between the solid state drive interface and the plural solid state drive module connectors, the mux/demux operable to selectively connect and disconnect the solid state drive interface with the plural solid state drive modules; and
a solid state drive inserted into each of the plural solid state drive module connectors to communicate with the motherboard.

11. The solid state drive assembly of claim 10 wherein the plural solid state drive module connectors comprise a first solid state drive module connector coupled to an upper side of the adapter circuit board and a second solid state drive module connector coupled to a lower side of the adapter circuit board so that solid state drives coupled to the first and second solid state drive module connectors align in a vertically stacked configuration.

12. The solid state drive assembly of claim 10 wherein the plural solid state drive module connectors comprise first and second solid state drive module connectors coupled to opposing ends of an upper side of the adapter circuit board so that solid state drives coupled to the first and second solid state drive module connectors align in a vertically stacked configuration.

13. The solid state drive assembly of claim 10 wherein the plural solid state drive module connectors comprise first and second solid state drive module connectors coupled to an upper side of the adapter circuit board perpendicular to the adapter circuit board interface so that solid state drives coupled to the first and second solid state drive module connectors extend out from the adapter circuit board in a side-by-side configuration.

* * * * *